United States Patent [19]

Buckley

[11] Patent Number: 4,585,046

[45] Date of Patent: Apr. 29, 1986

[54] APPARATUS FOR TRUING A SPOKED WHEEL

[76] Inventor: Ronald E. Buckley, 3057 Wachter Ave., Lower Burrell, Pa. 15068

[21] Appl. No.: 664,220

[22] Filed: Oct. 24, 1984

[51] Int. Cl.$^4$ .............................................. B21K 1/34
[52] U.S. Cl. .................................. 157/1.55; 81/58.2; 29/159.02
[58] Field of Search ................ 157/1.5, 1.55; 29/159.02, 159.03, 802; 81/57.14, 58.2

[56] References Cited

U.S. PATENT DOCUMENTS

| | | | |
|---|---|---|---|
| 3,024,834 | 3/1962 | Mennesson | 157/1.5 |
| 3,620,281 | 11/1971 | Hasegawa et al. | 157/1.55 |
| 3,631,577 | 1/1972 | Hasegawa et al. | 29/211 |
| 3,636,614 | 1/1972 | Damman et al. | 29/211 R |
| 3,758,931 | 12/1971 | Patterson | 29/159.02 |
| 3,840,965 | 9/1972 | Meiklejohn | 29/206 |
| 3,908,729 | 9/1975 | Carminati | 157/1.5 |
| 3,958,315 | 5/1976 | Kinney | 29/159.02 |
| 4,045,852 | 9/1977 | Winch | 29/159.02 |
| 4,187,895 | 6/1976 | Saruwatari et al. | 157/1.55 |
| 4,418,738 | 12/1983 | Kaufeldt | 157/1.55 |
| 4,427,047 | 1/1984 | Guillermier | 157/1.5 |

FOREIGN PATENT DOCUMENTS

| | | | |
|---|---|---|---|
| 281996 | 7/1928 | United Kingdom | 157/1.5 |
| 836276 | 6/1960 | United Kingdom | 157/1.5 |

Primary Examiner—James G. Smith
Attorney, Agent, or Firm—William D. Lanyi

[57] ABSTRACT

A spoked wheel truing machine is provided with a tool that is capable of clamping the shank of each spoke nipple and rotating it an integral number of revolutions. The particular direction of rotation of the clamping tool is determined by top and bottom limit switches along with left and right limit switches. A drive motor is used to rotate the spoked wheel about its axle and is provided with an automatic brake that maintains the position of the wheel when the motor is de-energized. The clamping tool is rotated into position around the nipple's shank when a signal is received indicating that a nipple is in an operative position and the rim proximate that nipple is axially misaligned. The truing apparatus also comprises a means for supporting the spoked wheel by its central axle in a position that disposes the axle in a horizontal plane. The truing apparatus aligns the radius of the rim in a preferred reference circle and aligns the rim in a vertical plane that intersects the hub of the wheel midway between its flanges.

17 Claims, 8 Drawing Figures

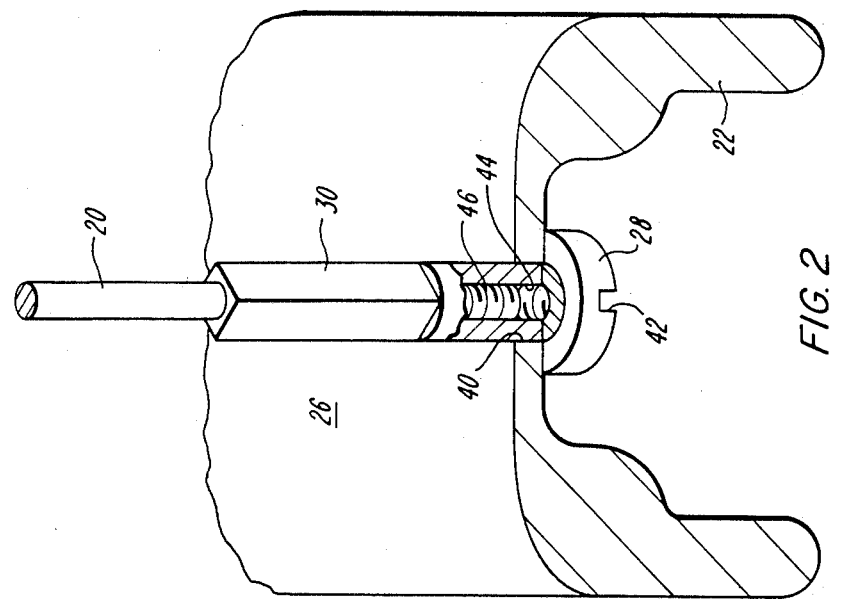
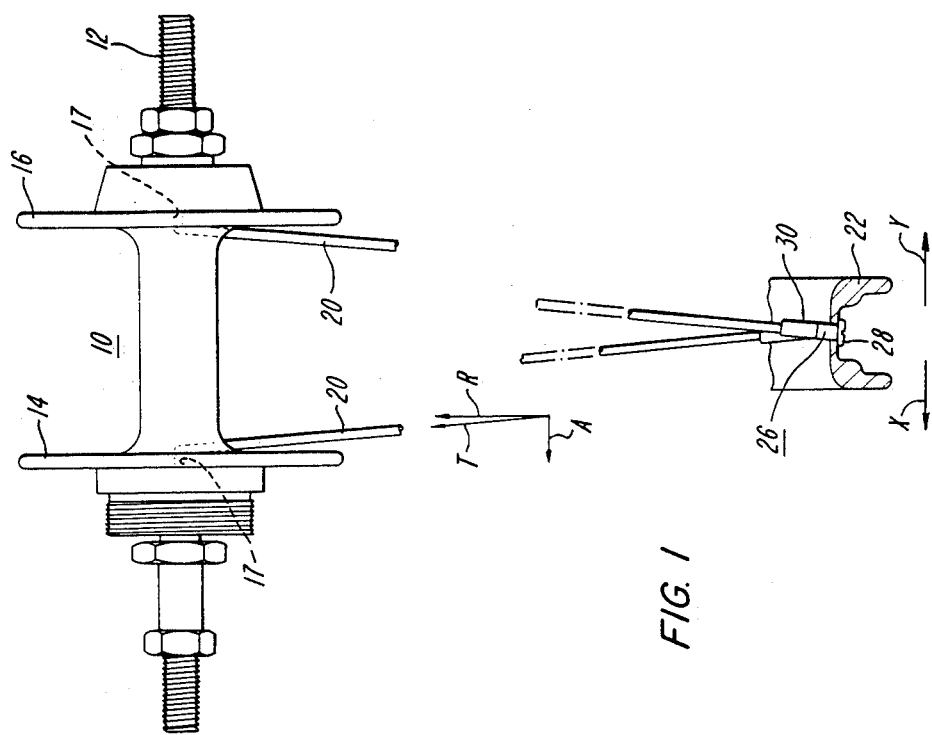

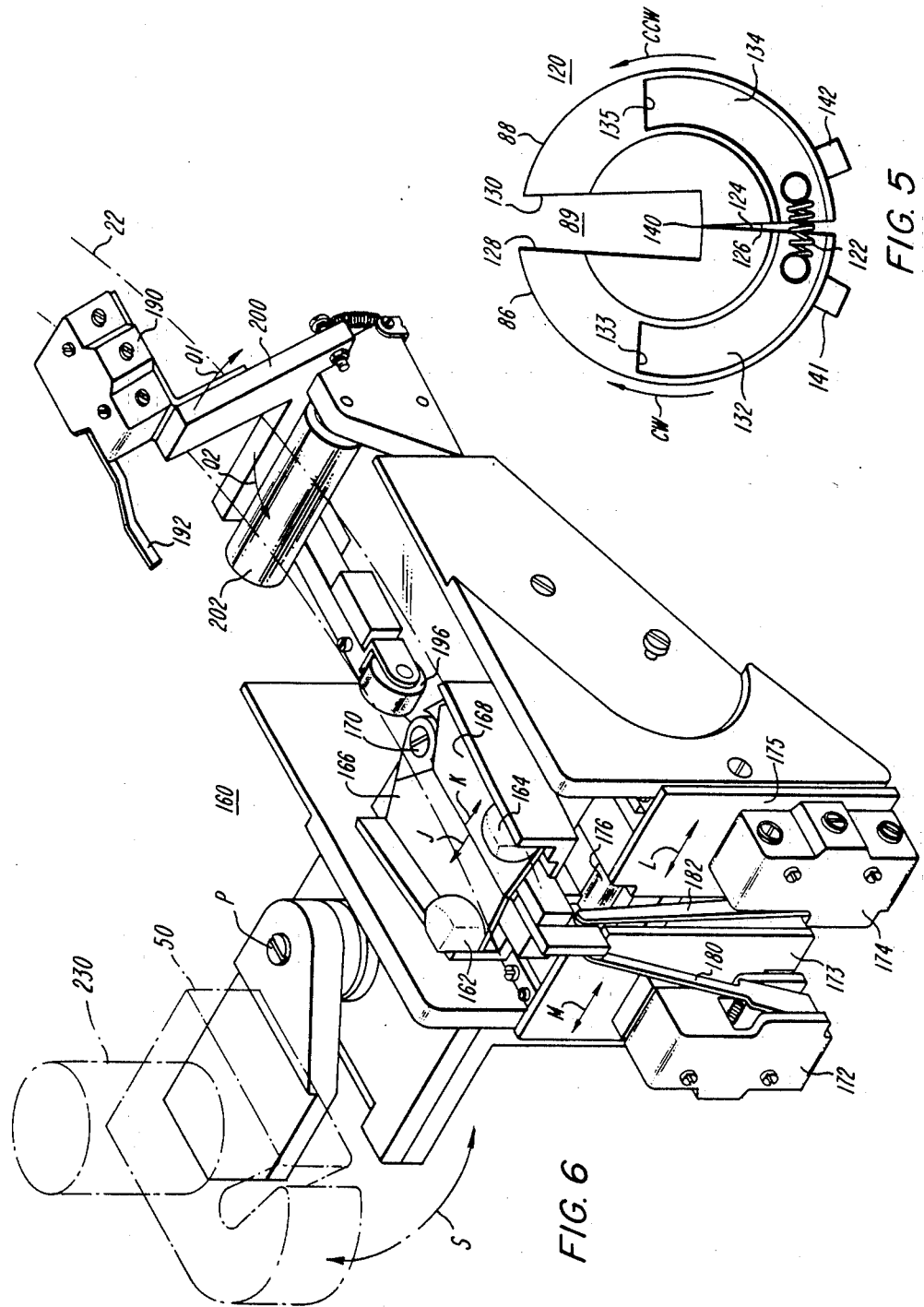

APPARATUS FOR TRUING A SPOKED WHEEL

BACKGROUND AND SUMMARY OF THE INVENTION

The present invention relates generally to the truing of spoked wheels and, more particularly, to an apparatus for adjusting the tension at each spoke of a wheel in a manner that aligns the rim of the wheel to a generally flat reference plane that is perpendicular to the central axis of the wheel.

Spoked wheels are used to provide rolling support for bicycles, tricycles, motor bikes, motorcycles, mopeds and various other types of vehicles. In a typical application, the spoked wheel comprises a centrally located hub which is generally cylindrical and disposed coaxially with an axle. The hub and axle are generally attached in such a way that the hub is free to rotate about the axle. Usually, the hub and axle are associated with an antifriction bearing mechanism disposed between them. Therefore, when the axle is rigidly attached to the frame structure of a bicycle or the like, the hub is free to rotate about the centerline of the axle.

The hub of a spoked wheel generally has two flanges with one flange being disposed at each axial end of the cylindrically shaped hub. The flanges are generally perpendicular to the central axis of the hub. Each of the hub flanges has circumferentially spaced holes through which wire spokes can be threaded or laced. In a typical application, each of the spokes is provided with a right angle end portion which extends through a hole in one of the hub flanges. Furthermore, each spoke is generally provided with a shaped end that prevents its end portion from being pulled through the hole in the hub flange.

A spoked wheel is also provided with a rim that is disposed coaxially around the hub with each portion of the rim being disposed a generally identical radial distance from the central axis of the axle. Each of the spokes extends outwardly from the hub flange and through one of a plurality of holes in the rim. In a typical application, the spokes do not extend in a direction which is perfectly radial from the axle. Instead, each of the spokes extends tangentially from the hub flanges.

The radially outward end of each spoke is attached to the rim of the wheel by the use of a nipple. Although the particular design of the nipple can vary from one application to another, it serves the purpose of preventing the radially outward end of the spokes from pulling away from the wheel's rim. Usually, the nipple is provided with a head portion that is disposed proximate the radially outward surface of the rim. The head of the nipple is made in such a way so as to prevent its passage through the hole, in the rim, through which its associated spoke extends. A tubular portion of the nipple extends radially inward through the whole and is provided with a centrally located threaded hole. The radially outward end of each spoke is threaded and can thus be attached to the rim by screwing the nipple onto the threaded portion of the spoke.

During initial manufacture of a spoked wheel and during subsequent alignment of the wheel, screwing the nipple onto the spoke has the affect of increasing the tension on the spoke and reducing the radial distance between the rim and the central axis of the axle. Furthermore, since the spokes extend from both hub flanges toward the rim, the spokes do not extend from the hub to the rim in a plane that is perpendicular to the central axis of the hub. Instead, each spoke is disposed at a slight angle between the hub flange and the rim since the plane of the rim intersects the hub at a point generally midway between the hub's flanges. Therefore, when the tension on the spoke is increased by threading the nipple onto the spoke, the portion of the rim attached to the spoke is pulled in a direction that has components in both perpendicular and parallel directions relative to the central axis of the hub and axle.

A spoked wheel can become misaligned either during initial manufacture or through subsequent use. Misalignment of a spoked wheel can be indicated by either one or both of two situations. First, the rim of a misaligned spoked wheel can exhibit a noncircular shape in which portions of the rim are disposed at different radial distances from the central axis of the hub than other portions of the rim. This condition can result in the rim being generally oval instead of circular. A second indication of a misaligned wheel is that the position of the rim is in a plane which is not perpendicular to the central axis of the hub or, alternatively, the wheel has a misshapen rim that cannot be defined by any single reference plane. Since the tension of each spoke determines the radial and axial position of the rim portion attached to that spoke, a misaligned wheel can generally be corrected by properly adjusting the tension of its spokes.

Various means for assembling, tightening and truing spoked wheels are known to those skilled in the art. U.S. Pat. No. 3,620,281, which issued on Nov. 16, 1971 to Hasegawa et al., discloses an apparatus that comprises a ring-shaped spoke inserting portion that is provided with slots into which the spokes of a provisionally assembled wheel are inserted. Driver devices, equal to the number of nipples and threadedly mated with the tips of the respective spokes of the wheel, are positioned to oppose each of the slots of a lower assembly at its outer peripheral position and are reciprocable in the directions of the spokes. The principal objective of this apparatus is the fastening of the spokes by clamping the rim and fastening the nipples with a constant torque. Torque motors are mounted on a base and are automatically stopped when a predetermined maximum load is applied to each nipple. A disadvantage of this type of apparatus is that, in many instances, a perfectly aligned rim will require different torques on each of the nipples of the spoked wheel.

U.S. Pat. No. 3,631,577, which issued on Jan. 4, 1972 to Hasegawa et al., discloses a machine for provisionally assembling wire spoke wheels. It comprises a rim positioning table that is rotatably mounted with a hub supporting cylinder. Nipples are automatically supplied to a driving means and mated with the threaded tips of the spokes. This type of machine is applicable for the initial assembly of spoked wheels, but does not provide a means for assuring the correct alignment of the rim or the proper tension on each of the spokes.

U.S. Pat. No. 3,758,931, which issued on Dec. 29, 1971 to Patterson, discloses a wheel assembly apparatus in which a bicycle wheel rim is placed on a fixture that is mounted on a rotary index table. A plurality of spokes are attached to the hub of the wheel. The hub is spun in order to cause the spokes to be centrifugally positioned in a substantially uniform angularly spaced relation. A portion of the device extends nut-like threaded fasteners, or nipples, through the holes in the rim and tightens the nipples onto the end portions of the spoke. This type of device is appropriate for use during initial assembly of spoked wheels, but does not provide a satisfactory means for assuring that the wheel's rim is properly aligned with respect to the central axis of the hub.

U.S. Pat. No. 3,840,965, which issued on Sept. 15, 1972 to Meiklejohn, and U.S. Pat. No. 4,187,895, which issued on June 23, 1976 to Saruwatari et al., both disclose apparatus for the manufacture of spoked wheels. These machines provide for the automatic assembly of wire spoked wheels, but do not provide a truing apparatus for the proper alignment of the wheel. Similarly, U.S. Pat. No. 3,636,614, which issued on Jan. 25, 1972 to Damman et al., and U.S. Pat. No. 4,427,047, which issued on Jan. 24, 1984 to Guillermier, disclose machines that are directed to the fitting of spokes into wheel hubs and assembly of spoked wheels. Both of these devices are applicable during the initial manufacture of spoked wheels, but are not directed to the truing of a spoked wheel.

U.S. Pat. No. 4,418,738, which issued on Dec. 6, 1983 to Kaufeldt, discloses a device for automatically tightening spokes of a spoked wheel. This device comprises a means for clamping the hub of the wheel and for engaging the outside edges of the rim. After the hub is securely clamped, the rim is secured so that it is accurately positioned on a single plane while each of a plurality of spoked nipples are tightened to an individual predetermined torque. This type of apparatus requires that the rim be securely clamped during the nipple tightening operation. Therefore, it does not provide for selectively determining the torque for each spoke based on the position of the rim portion adjacent the spoke.

U.S. Pat. No. 3,958,315, which issued on May 25, 1976 to Kinney, discloses a method of tightening the spokes of a wire wheel in which the spokes are divided into eight groups and in which four sets of two groups each are tightened in sequence. The rim of the wheel is secured during the nipple tightening operation. This method provides a procedure in which each of the nipples is first tightening to a finger-tight position and then the spokes are tightening in groups of adjacent spokes. This method does not provide a means for determining the tightness of each spoke in relation to the axial or radial position of the rim.

U.S. Pat. No. 3,908,729, which issued on Sept. 30, 1975 to Carminati, discloses a machine for securing the spoke nuts, or nipples, of a bicycle wheel while controlling the torque applied to each nut in response to the position of the nut on the wheel in relation to the order of tightening of the nuts. The torque applied is progressively greater from nut to nut, starting from the first nut, until a maximum torque is applied after the spokes over half the wheel circumference have been tightened. This device utilizes a torque regulator that performs independently from the actual position of the rim with respect to the center line of rotation of the hub and does not adjust the individual torques of each spoke in order to align the rim with respect to the axle center line.

U.S. Pat. No. 4,045,852, which issued on Sept. 6, 1977 to Winch, discloses a wheel truing machine for use with newly built spoked wheels. After the spokes of the wheel are fitted and nipples are loosely screwed onto the threaded ends of the spokes, the rim is secured in a concentric relationship with the hub. The rim is then locally depressed relative to the hub to a datum radius in the region of a nipple. The nipple is then partially tightened. This procedure is repeated until all of the nipples are tightened as desired. Since this machine exerts a force against the rim during the nipple tightening procedure, it does not permit the rim to move in response to the increased or decreased torque on each individual spoke. Therefore, when the rim is released, subsequent to the nipple tightening procedure, there is no guarantee that it will retain the desired position and relationship with respect to the central axis of the hub.

The machines and procedures for assembling and truing spoked wheels that are presently known to those skilled in the art exhibit certain significant disadvantages. These disadvantages can best be understood by comparing the known machines to the method employed during manual truing of a spoked wheel. In a typical manual truing operation, the operator first attaches the axle of a misaligned wheel to a support device. Generally, the support device is configured so that the spoked wheel is supported with its central axis of rotation disposed in a horizontal plane and the rim of the wheel disposed in a plane which is generally vertical. If the hub and rim is rotated about the fixed horizontal axle, the rim of a misaligned wheel will visually vary from a flat vertical plane and exhibit a noticeable "wobble". Using an appropriate device, such as a pointer or indicator gage, the operator then determines the approximate location of an ideal flat plane in which the misaligned rim would be disposed if it was properly aligned. After this reference plane is determined, the rim can be slowly rotated to determine the relative distortion of each portion of the rim from this ideal reference plane. Then, one by one, each spoke is either tightened or loosened to move its associated portion of the rim from its present position toward the ideal plane. As the tension on each spoke is manually adjusted, the rim of the misaligned wheel is gradually reshaped and the wheel's alignment is improved. This procedure is repeated until the rim is disposed in the ideal plane within some predetermined degree of accuracy. In order for the manual truing procedure to be performed properly, the rim of the spoked wheel is allowed to move freely in response to the increased or decreased tension on the spokes. The movement of the rim permits the operator to visually determine the individual affect of each spoke's adjustment.

Presently known machines for automatically truing spoked wheels do not accurately emulate the manual procedure described above. Instead, known techniques rigidly fasten the rim of the spoked wheel to a preselected datum plane and then tighten the nipples for each spoke of the wheel. Alternatively, some known methods attempt to achieve a constant predetermined torque on each spoke. When the rim is clamped during the tightening procedure, there is no guarantee that the rim will retain a perfectly circular and flat configuration when the clamping forces are released. Also, unless the rim is perfectly shaped in a circular and flat disposition when the spokes are loose, there is no logical reason to believe that identical torques on each spoke will achieve a properly aligned wheel. For example, assuming that the rim of the wheel has a slight oval shape in its relaxed state, identical torques on each spoke will not achieve a perfectly circular and flat rim since the rim's natural ovality must be overcome by the relative differences between the torques on the individual spokes.

The present invention aligns the spoked wheel by incorporating the successful techniques that have been used by wheelwrights to manually align spoked wheels. It supports the spoked wheel with the hub and rim being free to rotate about the center line of the axle.

Therefore, the result of the tightening, or loosening, of an individual nipple can readily be determined from the position change of that portion of the rim associated with the nipple and its connected spoke. The present invention determines the direction of misalignment of each portion of the rim, in both the radial and axial directions, and adjusts the torque of the associated spoke in response to this misalignment. Means are provided for determining the axial and radial directions of the rim's misalignment proximate a spoke of the wheel. Depending on the direction of misalignment, the nipple of the spoke is rotated in either a clockwise or counterclockwise direction about the centerline of the spoke. Although, in a preferred embodiment of the present invention, each sequential nipple adjustment comprises a single revolution of the nipple, alternative magnitudes of tightening or loosening could easily be employed.

The present invention also employs a means for rotating the rim of the spoked wheel about its central axis of rotation and stopping the rim at an angular location that places a preselected spoke at an operative position for adjustment. If the associated portion of the rim exhibits a deviation from a desired reference position, a nipple adjustment means is moved into position to encompass the shank of the nipple. The nipple adjustment means comprises a clamping member that can be rotated around the center line of the spoke and the nipple's shank. This rotation causes the nipple to move in relation to the spoke in either a clockwise or counterclockwise direction, depending on the direction of rotation of the clamping member. The clamping member is mounted in a frame member that is pivotally associated with the support structure that holds the axle of the wheel. This pivotally attached frame member and associated clamping device, or member, are each provided with a slot in their structures that permits them to be moved into a position that disposes the shank of the nipple at the center line of rotation of the clamping device. After one or more complete revolutions of the clamping device, the slots are again aligned to permit removal of the frame member away from the nipple's shank.

After this adjustment of the preselected nipple, the wheel is again rotated an angular distance that disposes a subsequent nipple at the operative position. When a nipple is disposed in the operative position, the present invention determines if the associated rim portion is aligned or misaligned with respect to the predetermined ideal plane. If the rim portion at the operative position is aligned within a predetermined degree of accuracy, the wheel is continually rotated in order to dispose the next subsequent nipple in the operative position. This procedure is continued and, upon the determination of misalignment of a rim portion in the operative position, the wheel is stopped and the nipple turning mechanism is again rotated about its pivot toward the nipple's shank and the above-described tightening, or loosening, operation is again performed.

The present invention provides a means for rotatably supporting the wheel and for rotating the wheel about the central axis of its axle. A means for stopping the wheel's rotation is provided so that each nipple can be disposed at the operative position for adjustment if necessary. The present invention also comprises means for indicating locations on the wheel's rim that deviate from ideal radial or axial positions. Means for rotating the nipple is provided. The nipple rotating means is shaped to engage the outer surface of the nipple at its shank. The nipple rotating means is also provided with a slot that permits the passage of the nipple's shank toward the center line of a rotatable clamping member when the nipple rotating means is moved toward the operative position. Indicating devices are employed in cooperation with a means for actuating the nipple rotating means. These actuating means, such as limit switches, provide signals that cause the nipple rotating means, or tool, to be moved about its pivot point toward the operative position.

By tightening or loosening each nipple, in response to the actual deviation of the rim proximate the nipple, the present invention automatically performs the procedures that are normally followed by wheelwrights during manual truing operations. Furthermore, the present invention avoids the normal disadvantages that are encumbent with the use of machines that clamp the rim of a spoked wheel during the torque adjusting operations. The present invention also provides a control scheme that permits a spoked wheel to be completely aligned and adjusted without manual intervention except for the initial mounting of the wheel in the present invention and subsequent dismounting of the wheel following the termination of the automatic truing operation.

BRIEF DESCRIPTION OF THE DRAWING

The present invention will be more fully understood from a reading of the following description of the preferred embodiment in conjunction with the drawing, in which:

FIG. 1 illustrates a spoked wheel of the type that can be aligned by the present invention;

FIG. 2 is a detailed illustration of a nipple of a spoked wheel;

FIG. 5 is a detailed illustration of the clamping jaws of the present invention;

FIG. 6 illustrates the axial alignment member of the present invention;

DESCRIPTION OF THE PREFERRED EMBODIMENT

Figure 3:
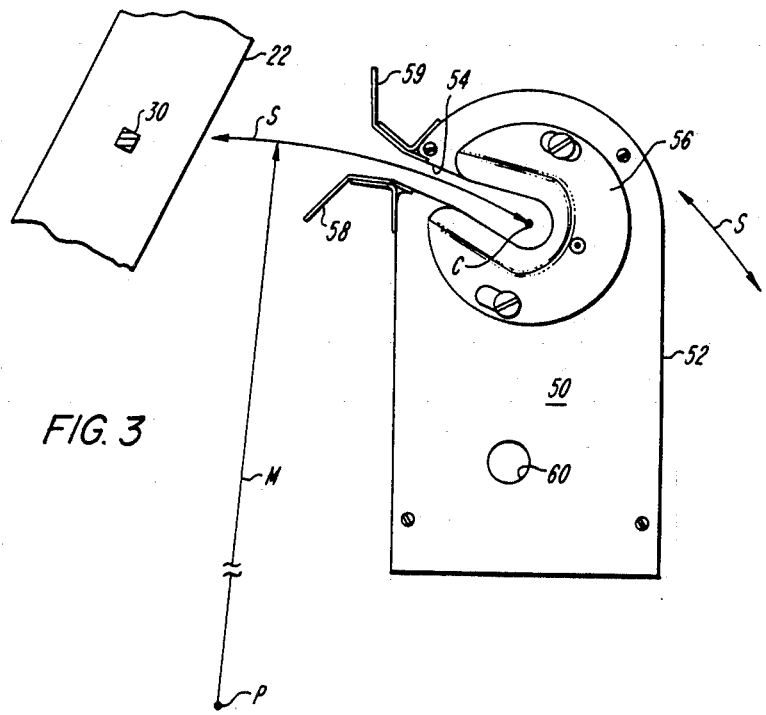
FIG. 3 illustrates the portion of the present invention that is utilized to rotate the nipple of a spoked wheel.

In the description of the preferred embodiment, like reference numerals will be used to designate like components throughout all of the Figures.

FIG. 1 illustrates an exemplary spoked wheel that is suitable for alignment by the present invention. It comprises a generally cylindrical hub member 10 which is rotatably attached to an axle 12. An antifriction bearing (not illustrated in FIG. 1) is disposed within the hub 10 in order to permit the hub 10 to rotate about the center line of the axle 12.

The hub 10 is provided with two flanges, 14 and 16, and each of these flanges is provided with a plurality of holes 17 that are circumferentially spaced about each flange. Each of these holes is shaped to receive one end of a spoke 20 in such a way so as to retain the spoke and prevent its movement during use of the wheel. Each spoke 20 extends between one of the holes 17 in the flanges and a hole extending through the rim 22 of the spoked wheel in a generally radial direction. Each spoke 20 is provided with a threaded end. The threaded end of each spoke 20 is disposed in a radially outward direction from the hub 10. A plurality of holes is provided in the rim 22 and each of the rim's holes extends in a generally radial direction therethrough. Each spoke 20 is associated with a nipple 26 that comprises a threaded hole shaped to receive the threaded end of the spoke 20.

Normally, each nipple 26 is provided with a head portion 28 and a shank portion 30. The shank portion 30 extends through the hole in the rim 22 and the head portion 28 is disposed against the radially outward surface of the rim 22, as illustrated in FIG. 1.

As is apparent in FIG. 1, a rotation of the nipple 26 will cause a tightening, or loosening, of the spoke 20 between the rim 22 and the flange, either 14 or 16, associated with the particular spoke. Therefore, tightening the nipple 26 will result in increased tension on the associated spoke 20 and loosening the nipple 26 will result in decreased tension on the spoke 20.

In FIG. 1 it can be seen that, with the use of two hub flanges, the spokes 20 do not extend in a perfectly radial direction between the central axis of the axle 12 and the rim 22. Instead, the spokes 20 extend from their associated hub flange, either 14 or 16, toward the rim 22 at an angle which deviates from a line that is perpendicular to the central axis of the axle 12. Therefore, if the hub 10 and axle 12 are restrained from moving in a direction parallel to the central axis of the axle 12, a tightening or loosening of a preselected spoke 20 will cause the rim 22 to move relative to the hub 10. Force vectors T, R and A illustrate this concept. If a tension force T is provided, by tightening a nipple 26, this tension force T on the spoke 20 has two components. The radial component R extends in a direction perpendicular to the center line of the axle 12 and the axial component A extends in a direction parallel to the central axis of the axle 12. Each of these components of the tension force T will affect the position of the rim 22 in relation to the hub 10 and axle 12. Of course, it should be understood that each spoke of the wheel provides only a minor portion of the total forces exerted between the rim 22 and the hub flanges, 14 and 16. For example, a typical spoked wheel may comprise 36 individual spokes. Each of these spokes exerts its own tension force between the rim 22 and the hub 10. Also, each spoke exerts both radial R and axial A components on the portion of the rim 22 that is proximate the nipple 26 associated with that spoke. Therefore, it is a combination of forces which determines the overall shape and position of the rim 22 in relation to the hub 10.

Referring specifically to the spoke 20 which, in FIG. 1, is shown extending between the hub flange 14 and the rim 22, the basic concept of wheel alignment will be described. If, for example, a wheelwright determines that the rim 22 deviates from a desired plane in the direction illustrated by arrow Y, the nipple 26 can be rotated with respect to the spoke 20 in such a way so as to increase the tension on the spoke between the rim 22 and the flange 14. This increased tension will provide an axial force component A in the direction indicated by arrow X. This force will cause the rim 22 to move in the direction of arrow X and toward the desired reference plane. In a typical application, the desired reference plane would be a flat plane that is perpendicular to the central axis of the axle 12 and intersecting the hub 10 midway between the flanges, 14 and 16.

The wheelwright could also correct any radial deviations of the rim 22 by adjusting the torque on the spoke which is proximate the portion of the rim exhibiting the deviation. By adjusting each spoke sequentially, a wheelwright can manually complete the truing operation on the spoked wheel by sequentially correcting each local deviation until the overall rim 22 is located in the desired, or ideal, reference plane within a predetermined degree of accuracy.

FIG. 2 is a detailed illustration of a nipple 26 connecting a spoke 20 to the rim 22. The nipple 26 comprises a head portion 28 and a shank portion 30. The shank portion 30 is shaped to pass through a hole 40 in the rim 22. The head portion 28 of the nipple 26 is shaped to prevent the passage of the nipple 26 in a radially inward direction through the hole 40 of the rim 22. Usually, the head portion 28 is provided with some means for permitting the nipple 26 to be rotated about the center line of the spoke 20. In FIG. 2, this means is illustrated as a slot 42 in the head portion 28. This type of slot 42 is appropriate for use with a screwdriver-type device disposed proximate the head 28 at the radially outward portion of the rim 22. The nipple 26 is provided with a central threaded hole 44 that is shaped to receive the threaded end 46 of the nipple 20 in threaded relation.

As can be seen in FIG. 2, the rotation of the nipple 26 about the center line of the spoke 20 will cause the tension on the spoke 20 to be increased or decreased, depending on the angular direction of rotation of the nipple 26. In FIG. 2, the shank 30 of the nipple 26 is illustrated as having flat sides. Although this is generally the case, it should be understood that alternative surfaces can be provided on the shank 30.

FIG. 3 illustrates the means, incorporated in the present invention, for rotating the nipple of a spoked wheel during the truing operation. Its primary function is to grip and rotate the shank portion 30 of a nipple that is connected to a rim 22 of a spoke wheel. A related purpose of the nipple rotating means, or tool 50, is to deliver a gripping mechanism to an operative position in such a way that the shank 30 is positioned at the center of rotation of the gripping mechanism. The tool 50 comprises a frame structure 52 which supports the components of the tool 50.

The tool 50 is provided with a slot 54 that is shaped to receive the shank 30 of the nipple when the tool 50 is rotated, about a point P, toward the operative position at which the nipple is located. The tool 50 is pivotally mounted on a support structure (not shown in FIG. 3) that permits it to rotate about point P so that it travels along an arcuate path illustrated by arrows S. A rotatable gripping device is located under the cover 56. The rotatable gripping device, or clamping member, is also provided with a slot that can be aligned with the slot 54 of the tool 50. The clamping member, which will be described in greater detail below, is shaped to receive the shank 30 between two jaws when the slot of the clamping member and the slot 54 of the tool 50 are aligned and the clamping member is stationary relative to the tool 50. The tool 50 is also provided with guides, 58 and 59, which aid in aligning the slot 54 with the shank 30 of the nipple as the tool 50 is moved into the operative position.

The tool 50, illustrated in FIG. 3, is a box-like structure that encloses the rotatable clamping member and associated gears. The hole 60 permits a shaft of a motor to extend into the tool 50 and be connected, through a geartrain, to the rotatable clamping member. A motor (reference numeral 230 in FIG. 7) is attached to the tool 50 and its shaft extends through the hole 60. For purposes of clarity, the motor is not shown in FIG. 3, but it should be understood that the motor provides the driving torque for the clamping member. Various types of motors can be used in conjunction with the tool 50 of the present invention, but a preferred embodiment of the present invention utilizes a reversible, alternating current motor. One particular type of motor 230 that has been used in a prototype of the present invention is a twenty-five RPM, one seventieth HP alternating current motor.

Figure 4:
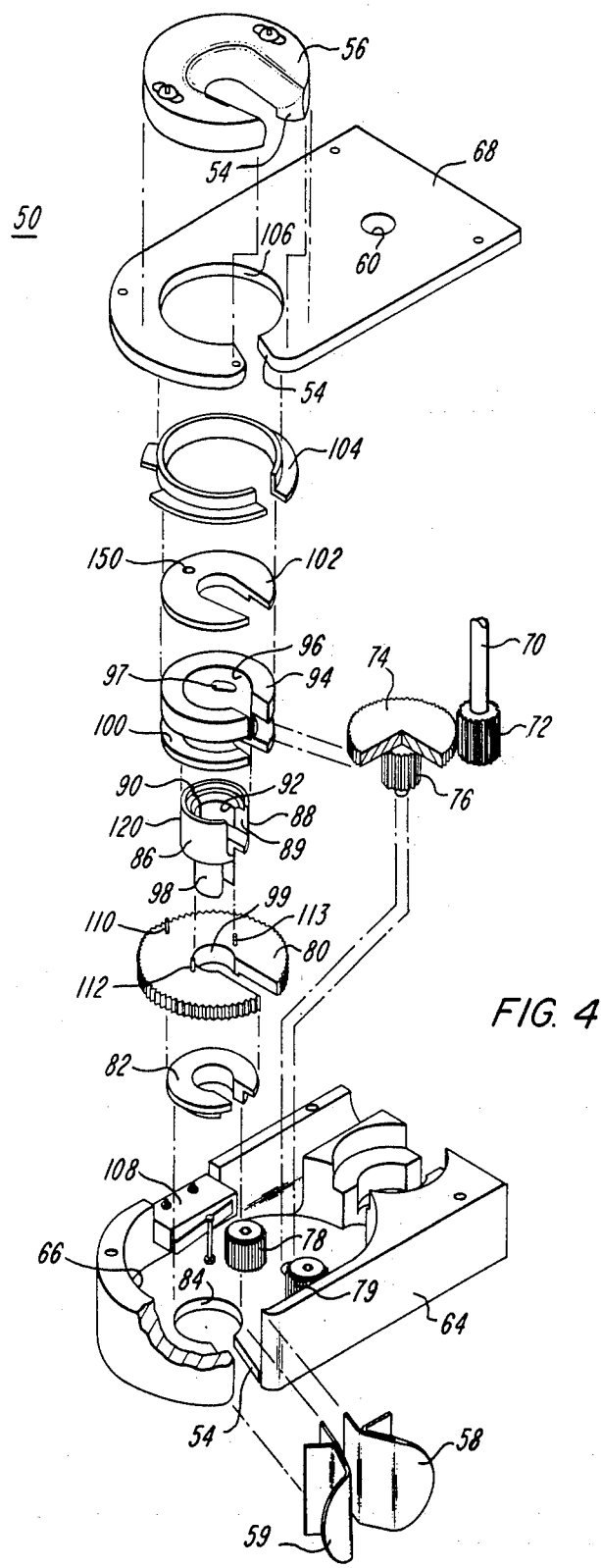
FIG. 4 is an exploded view of the tool shown in FIG. 3.

FIG. 4 illustrates an exploded view of the nipple rotating means, or tool 50. It comprises a bottom member 64 which functions as an enclosure for the rotatable portions of the clamping member. It has a cavity 66 in which the rotatable components of the tool 50 are disposed.

The hole 60 in the top plate 68 is shaped to permit a shaft 70 of the above-described motor to pass through the top plate 68. A gear 72 is attached to the shaft 70 and shaped to engage another gear 74. Attached to gear 74 is a smaller gear 76 which is shaped to engage both planetary gears, 78 and 79. The planetary gears, 78 and 79, provide a rotating force on the driving member 80 of the clamping device.

In operation, the motor shaft 70 drives gear 72 which is engaged with gear 74. The resulting rotation of gear 74 and 76 cause planetary gears 78 and 79 to rotate in contact with the gear teeth of drive member 80. A bushing 82 is disposed in a hole 84 through the bottom of the bottom member 64.

The clamping member comprises two jaws, 86 and 88, which are associated together to form a generally cylindrical configuration with a slot 89 that can be aligned with the slot 54 in the other components of the tool 50. The two jaws, 86 and 88, are free to move relative to each other. These two jaws are in contact with each other along a coplanar surface 90 when in a deactivated position. However, the jaws are associated together in such a way that they can pivot about a vertical line (reference numeral 140 in FIG. 5) described by the intersection of the coplanar surface 90 with the slot 89 of both jaws, 86 and 88. The two jaws are attached to each other by a resilient member, such as a spring (not illustrated in FIG. 4). A containment member 94 is slotted and has an inner bore 96 which is shaped to receive the jaws, 86 and 88, in slidable association therein. When assembled, the bottom portion 98 of the jaw assembly is disposed in the hole 99 of the drive member 80 while the upper portion of the jaw assembly is disposed in the bore 96 of the containment member 94.

As can be seen in FIG. 4, the containment member 94 is provided with a circumferential groove 100 that is shaped to receive gear 74 in clearance relationship therein. The circumferential groove 100 prevents interference between the operation of the gear 74 and the other components of the gripping device. The cap 102 prevents the jaws, 86 and 88, from sliding upward out of the containment member 94. Upper bearing 104 is attached to the top plate 68.

All of the slotted and rotatable members of the clamping device are assembled within the cavity 66 of the bottom member 64 and the top cover 68 is disposed thereover. The cover 56 serves as a cover over the hole 106 and can also serve as a guide shoe for the prevention of wear of the various slotted components.

Within the cavity 66 of the bottom member 64, a switch 108 is disposed at a position in which it can be actuated by the movement of the pin 110 which is attached to the drive member 80. The association of the switch 108 and the pin 110 are configured in such a way that a signal from the switch 108 is indicative of the completion of one complete rotation of the drive member 80 and its associated rotatable members. A signal from switch 108 can therefore be used to turn off the motor so that shaft 70 will stop its rotation when the slots 54 are aligned with the slots in all of the rotatable members of the clamping device.

Pins 112 and 113 are attached to the drive member 80 in order to permit the drive member 80 to cause the jaws, 86 or 88, to rotate about the central axis of rotation of the rotatable components. It should be understood that the jaws, 86 and 88, are free to move in relationship to each other and to the drive member 80 and containment member 94. A more detailed description of the drive member 80 and jaws, 86 and 88, will be discussed below in relation to FIG. 5.

Since the shank 30 of the nipple 26 can vary in size and shape and is generally much smaller than the width of the slot 54, some means must be provided for clamping against the surface of the shank in order to cause the nipple to rotate with the clamping device illustrated in FIG. 4. This function is provided by the particular association of the jaws, 86 and 88, with each other and with the other components of the tool 50. After the tool 50 is pivoted into position at the operative position around the nipple's shank 30, the center line of the spoke 20 and shank 30 of the nipple 26 are located at the approximate center line of holes 84, 99, 92, 96 and 106. However, the shank 30 of the nipple 26, in the most likely situation, will not be in rigid contact with any of the components of the clamping device. If the rotatable members of the clamping device are rotated about their center lines while the shank 30 is not in rigid contact with them, the clamping device components will rotate freely about the stationary shank 30 of the nipple 26. In order to prevent this from occurring, the jaws are associated together to provide a clamping force against the outer surface of the shank 30. The jaws, 86 and 88, are shaped and associated together to pivot about a line (reference numeral 140 in FIG. 5) which is defined by the intersection of the slot 89 and the coplanar surface 90 between the jaws, 86 and 88. As the rotatable components of the tool 50 are caused to rotate by the action of the gears 72, 74, 76, 78, 79 and 80, a generally flat surface of one of the jaws will move toward the shank 30. The particular jaw that moves towards the shank 30 is dependent upon the rotational direction, which can be either clockwise or counterclockwise. A flat inner surface of the other jaw would normally be expected to rotate away from the surface of the shank 30. However, because of the interaction of pins (reference numerals 141 and 142 in FIG. 5) attached to the jaws with slots (only one slot 97 is illustrated in FIG. 4) in the containment member 94, this other jaw is prevented from moving in relation to the containment member 94. Once the jaws, 86 and 88, move in such a way so as to cause their inner surfaces, 128 and 130, to contact the shank 30, by pivoting about the vertical line described above, they combine to grip the shank 30 in a vice-like manner and force the nipple to rotate about the center line of its associated spoke 20 along with the rotatable components of the clamping member. Therefore, if the switch 108 is used to terminate the rotation of the rotatable components of the tool 50 after one complete rotation, the nipple 26 will be caused to rotate one revolution about the center line of its associated spoke 20 and the nipple 26 will be tightened, or loosened, with respect to the threaded end of the spoke 20, depending on the direction of rotation of the rotatable components of the tool 50.

The jaw assembly 120, which comprises the two jaws, 86 and 88, is shown in greater detail in FIG. 5. The two jaws, 86 and 88, cooperate together in order to provide a gripping action against the surface of the nipple's shank (reference number 30 in FIG. 2). The two jaws are shaped to be symmetrical about a plane extending between them. Each jaw is free to move, with limited independence, with respect to the other jaw. The two jaws of the jaw assembly 120 are connected by a resilient member, such as the spring 122. When no external force is operating on the jaws, 86 and 88, the spring 122 exerts a force in a direction that draws surfaces 124 and 126 into contact with each other along a common plane. The spring 122 also exerts a force which pulls clamping surfaces 128 and 130 apart.

When no external forces are acting on the jaws, 86 and 88, the force of the spring 122 and the inner cylindrical surface 96 of the containment member 94 constrain the jaw member 120 in a generally cylindrical configuration. Furthermore, when assembled in the tool 50, the cap 102 and drive member 80 constrain the jaw member 120 in its axial directions. The jaws, 86 and 88, are each provided with arcuate grooves, 132 and 134, respectively. These grooves are shaped to receive the pins, 112 and 113, which are attached to the upper surface of the drive member 80 as illustrated in FIG. 4.

Referring to FIGS. 4 and 5, the jaw member 120 is associated in cooperation with the drive member 80 in such a way that its smaller diameter portion 98 is disposed in the opening 99 and the pins, 112 and 113 of the drive member 80 are disposed within the grooves, 132 and 134. Each of these pins is disposed within its associated groove at a location near the end of the groove that is closest to the clamping surfaces, 128 and 130. It should be understood that, when assembled, pin 112 would be disposed in groove 132 and pin 113 would be disposed in groove 134.

Although the drive member 80 is not shown in FIG. 5, it should be understood that when the drive member 80 is rotated in the clockwise direction as indicated by arrow CW, pin 112 would move within groove 132 until it engages the end 133 of groove 132 which is closest to clamping surface 128. As pin 112 engages this end of groove 132, it will exert a rotational force on jaw 86 in the clockwise direction. Since pins 112 and 113 are attached to the drive member 80, pin 113 will also move in a clockwise direction within groove 134. However, since pin 113 is disposed within groove 134 close to the end 135 of the groove which is closest to clamping surface 130, it will be free to travel within groove 134 an arcuate distance which is greater than pin 112 is free to travel in groove 132 prior to contacting the end 133 of groove 132. Therefore, as pin 112 is causing jaw 86 to rotate in the clockwise direction, pin 113 is moving with respect to jaw 88 and jaw 88 will therefore not move with respect to the containment member 94. With respect to the containment member 94, jaw 88 remains stationary while jaw 86 moves in a clockwise direction.

The clockwise rotation of jaw 86 causes surfaces, 124 and 126, to part as the two jaws pivot about line 140. This same motion causes clamping surfaces, 128 and 130, to move toward each other. If any object is disposed between the clamping surfaces, 128 and 130, it will eventually experience a clamping force. When the tool 50 is disposed in the operative position around the shank 30 of the nipple 26, the jaws, 128 and 130, will provide a clamping force against the shank.

After contact is made by the clamping surfaces, 128 and 130, the jaw member 120 continues to rotate in a clockwise direction, as indicated by arrow CW, for one complete revolution as described above. Since the shank 30 of the nipple 26 is gripped by the clamping surfaces 128 and 130 during this rotation of the jaw member 120, the nipple is caused to rotate one full revolution. When the rotation stops, pin 112 no longer exerts a force against the end of the groove 132 and the force between the clamping surfaces, 128 and 130, is released. When this clamping force is released, tool 50 can be caused to pivot about its center of rotation (point P in FIG. 3) and the tool 50 can be removed from the operative position.

The above discussion describes how the nipple 26 can be caused to rotate in a clockwise direction. Since the jaws, 86 and 88, are symmetrical about a plane disposed between them, the principles described above are also applicable during a counterclockwise rotation of the clamping member. For example, if drive member 80 is caused to rotate in a counterclockwise direction as indicated by arrow CW in FIG. 5, pin 113 will engage the end 135 of groove 134 which is closest to the clamping surface 130. Simultaneously, pin 112 will be free to move within groove 132 and will therefore exert no force on jaw 86. Jaw 88 will be caused to rotate in a counterclockwise direction and clamping surface 130 will be moved toward clamping surface 128. Surfaces 124 and 126 will move away from each other as the jaws pivot about a common line 140 of rotation. Therefore, it should be understood that the jaw member 120 can be utilized to rotate the nipple 26 in either the clockwise or counterclockwise direction, as indicated by arrows CW and CCW, respectively. In either case, the spring 122 will draw the surfaces, 124 and 126, together when the force is removed from between either pin 112 or 113, and its associated groove, 132 or 134. This resilient member will cause the clamping surfaces, 128 and 130, to move apart and thus permit the tool 50 to be withdrawn from the operative surface around the shank 30 of the nipple 26.

Referring again to FIGS. 4 and 5, it should be understood that the containment member 94 has two grooves in its lower surface (not shown in FIG. 4) which are slightly longer in arcuate distance than grooves 132 and 134 in the jaws, 86 and 88, respectively. The purpose of the grooves in the underside of containment member 94 is to permit the pins, 112 and 113, to extend through them and into the grooves, 132 and 134. The containment member 94 also has two grooves (only groove 97 is visible in FIG. 4) that are associated with pins 141 and 142 to prevent movement between the containment member 94 and the jaw, either 86 or 88, which is not being driven by the drive member 80. The function of the grooves in the inner surface 96 of containment member 94 is to prevent a clockwise movement of jaw 88, or a counterclockwise movement of jaw 86, with respect to the containment member 94. This is accomplished by providing a pin in each jaw that extends radially outward into the grooves in the cylindrical surface 96 of containment member 94. These pins are illustrated in FIG. 5 by reference numerals 141 and 142. Pins 141 and 142 extend outward into the grooves in the inner cylindrical surface of containment member 94 proximate the ends of those grooves that are nearest the clamping surfaces 128 and 130. Therefore, if any force is exerted against jaw 86 in a counterclockwise direction, pin 141 will make contact with the end of its associated groove in the containment member 94 and relative movement between jaw 86 and containment member 94 will be prevented. Similarly, if a clockwise force is experienced by jaw 88, pin 142 will abut the end of its associated groove in the inner cylindrical surface 96 of containment member 94 and relative movement between jaw 88 and the containment member 94 will be prevented.

Referring to FIGS. 4 and 5, in view of the above description of the jaw member 120, the operation of the tool 50 of the present invention can more readily be understood. When the motor shaft 70 causes its associated gear 72 to rotate, gears 74 and 76 also rotate. Since gear 76 is in contact with gears 78 and 79, and drive member 80 is in contact with gears, 78 and 79, the drive member 80 is caused to rotate. When drive member 80 rotates, one of its pins, 112 or 113, will engage the end of its associated groove, 132 or 134, in the jaw assembly 120 and the associated jaw, 86 or 88, will pivot about line 140. This movement will continue until the shank of the nipple is engaged between the two clamping surfaces 128 and 130. (If no nipple shank is disposed between the clamping surfaces, this movement will continue until other portions of the jaws contact each other). When the shank of the nipple is clamped between the clamping surfaces 128 and 130, it is caused to rotate along with the drive member 80 and jaw assembly 120. Since one of the pins, 141 or 142, will be in contact with the end of its associated groove in the inner surface of containment member 94, the containment member 94 will also rotate along with the jaw assembly 120 and the drive member 80. Since the cap 102 is rigidly attached to the containment member 94, it will also rotate with the rest of the assembly. This movement will continue until one complete revolution is completed, as indicated by contact between pin 110 and switch 108. At that time, the motor of shaft 70 will stop andd the spring 122 will cause the clamping surfaces, 128 and 130, to part. This will release the clamping force against the surfaces of the nipple shank 30 and the tool 50 can then be moved so as to remove the nipple shank 30 out of the groove 54.

Referring to FIG. 4, lower bearing 82 does not rotate with drive member 80. Instead, it is attached to the opening 84 in order to provide a bearing surface between the rotating and stationary members. Similarly, the upper bearing 104 remains stationary and is disposed in opening 106 to provide a similar function.

In order to improve the operation of the tool 50, the cap 102 is provided with a small ball bearing 150 in its upper surface. Furthermore, cover 56 is provided with a small depression (not shown in FIG. 4) in its undersurface that is shaped to receive the ball bearing 150. The relative shapes and sizes of the ball bearing 150 with its associated depression in the cover 56 provide a slight force that tends to retain the containment member 94 in a position with its slot aligned with slot 54. This slight force prevents any random rotation of the containment member 94 prior to its being rotated by the movement of the jaw assembly 120 as described above. This force provides sufficient starting friction to maintain the containment member 94 in position until the jaw assembly 120 is rotated by the action of the pins, 112 or 113, within the grooves, 132 or 134, as described above. When the ball bearing 150 is caused to move away from the depression in the undersurface of cover 56, it also provides a slight frictional force against the undersurface of cover 56 and aids in the clamping action of the jaws, 86 and 88, against the shank 30 of the nipple 26.

In the above discussion relating to FIG. 1, it was described how the rim 22 of a wheel can be in axial misalignment relative to a plane intersecting the hub 10 midway between its flanges, 14 and 16, and perpendicular to its axle 12. FIG. 6 illustrates the portion of the present invention that is directed toward the measurement of this type of axial misalignment. The position of the rim 22 of a spoked wheel is illustrated, by phantom lines, in FIG. 6 in association with the axial alignment member 160 of the present invention. The rim 22 is disposed between two pads, 162 and 164, that are made of a low friction material, such as nylon or teflon. Pad 162 is attached to a platform 166 and pad 164 is attached to a platform 168. Each of these platforms are rotatably attached to a bolt 170 about which they are able to pivot. If the rim 22 is axially misaligned in a direction toward pad 162, it will exert a force against pad 162 and platform 166 will pivot in a direction indicated by arrow J. Similarly, if rim 22 is axially misaligned in a direction toward pad 164, it will exert a force against pad 164 and platform 168 will be caused to rotate in a direction indicated by arrow K.

The axial alignment member 160 also comprises two limit switches 172 and 174. Each of these limit switches is attached to a platform that is slidably associated with a rod 176 that has a generally circular cross section. Limit switch 172, and its associated bracket 173, can therefore move back and forth as indicated by arrow M and limit switch 174, along with its associated bracket 175, can move back and forth as indicated by arrow L. Rod 176 is shaped to be received in slidable association with generally circular holes (not shown in FIG. 6) in the rear portions of brackets 173 and 175. The frictional relationship between the rod 176 and its associated holes in the brackets, 173 and 175, is sufficiently low to permit movement of the brackets when an external force is exerted upon them, but also sufficiently high to permit random movement caused by slight vibrational forces. Therefore, if the brackets, 173 and 175, are caused to move by an external force exerted by the platforms, 166 and 168, they will tend to move to a position and maintain that position until another external force is exerted upon them.

The limit switches, 172 and 174, along with their associated brackets, 173 and 175, permit the present invention to create a reference plane that represents an ideal reference plane passing through the rim of the spoked wheel perpendicular to its central axis of rotation.

When a spoked wheel is initially mounted in the present invention, the pads, 162 and 164, are manually moved inward against the rim 22. The spoked wheel is then caused to rotate at least one complete revolution about the center line of its axle. This rotation of the spoked wheel will cause the pads, 162 and 164, to be pushed axially away from the ideal reference plane by a magnitude represented by the portions of the rim that represent the greatest magnitude of axial misalignment of the spoked wheel.

This initial rotation of the spoked wheel will cause outward forces against the pads, 162 and 164. The associated movement of the platforms, 166 and 168, will cause forces against the brackets, 173 and 175, that will move them and the bodies of the limit switches, 172 and 174, away from each other. They will be moved away from each other by a magnitude that represents the maximum axial deviation of the rim 22. A point that is exactly midway between the two limit switches 172 and 174, will represent an ideal reference plane to which the spoked wheel can then be aligned. It should be understood that, after the limit switches are pushed apart as described above, the actuators, 180 and 182, will remain in a central position in contact with surfaces that are associated with platforms 168 and 166, respectively. This relationship between the actuators, 180 and 182, and the surfaces of the platforms is illustrated in FIG. 6. Once the ideal reference plane is established as described above, any movement of the pads, 162 and 164, will cause their respective actuators, 182 or 180 respectively, to provide an electronic signal when a preselected threshold movement is exceeded. For example, if the axial misalignment of the rim 22 causes a force on pad 164 to move platform 168, actuator 180 will move and limit switch 172 will send an electrical signal that is representative of this misalignment. Similarly, if the axial misalignment of a portion of the rim 22 exerts a force against pad 162 and platform 166, actuator 182 will move and limit switch 174 will cause an electrical signal to be sent that represents a misalignment of the wheel rim 22.

As the spoked wheel is rotated about its center of rotation, different portions of the rim 22 are sequentially disposed between pads, 162 and 164. The movements of the platforms, 166 and 168, about pivot point 170 will represent misalignments of the wheel's rim 22. The signals that are generated by the actuators, 180 and 182, will therefore represent the existence of a misalignment and the direction thereof. The signals received from the limit switches, 172 and 174, will therefore determine whether or not the nipple that is disposed in the operative position between the pads, 162 and 164, requires corrective action. Furthermore, since the direction of misalignment is also known, the direction of nipple rotation that is required to correct the misalignment can be determined.

As described in relation to FIG. 1, a typical spoked wheel comprises spokes that extend from the hub 10 toward the rim 22 in one of two different angles. These angles extend from either flange 14 or flange 16 toward the center of the rim 22. Depending on which type of spoke angle is associated with the misaligned portion of the rim 22, different corrective rotations of the nipple will be required. As illustrated in FIG. 1, a tension force T will cause an axial force A and a radial force R. Depending on which flange, 14 or 16, the spoke extends from, a tension force T will either cause a movement in direction X or direction Y. Therefore, it is important to determine the angle between the spoke and the rim 22. In other words, it must be determined if the spoke is connected to flange 14 or flange 16. In order to determine this, the present invention is provided with a mixer switch 190 which has an actuator 192 as illustrated in FIG. 6. The mixer switch 190 is disposed a predetermined distance from the operative position between the pads, 162 and 164. This predetermined distance represents an integral and known number of spokes of the spoked wheel. It can either represent an even or an odd integral number of spokes, but the particular number of spokes must be known so that it is known whether or not the spoke in contact with the actuator 192 is identical, or opposite, in character to the spoke extending toward the operative position between the pads 162 and 164. More specifically, it must be known if these spokes both extend from the same flange or from opposite flanges of the hub 10.

As the spoked wheel rotates about its center of rotation, the actuator 192 is positioned so that only spokes that are connected to the flange nearest the limit switch 190 will cause a signal to be generated. The presence of this signal, or its absence, will determine the rotational direction that is required to correct the misalignment detected by either limit switch 172 or 174.

In order to properly stop the rotation of the spoked wheel with a nipple positioned at the operative position between pads 162 and 164, some means must be provided to generate an electrical signal when a nipple is in the operative position. This signal is generated by a limit switch whose actuator is indicated by reference numeral 196 in FIG. 6. The actuator 196 is in contact with the outside circumference of the rim 22. When a nipple passes proximate the actuator 196, the head 28 of the nipple 26 causes a movement of the actuator 196. This movement indicates that a nipple is in a position against the actuator 196. By judiciously positioning the actuator 196 an integral number of spokes relative to the operative position between the pads, 162 and 164, it can be assured that when a nipple is in contact with the actuator 196, another nipple is disposed in the operative position between pads 162 and 164. Therefore, any signal from the limit switch associated with actuator 196 will represent the presence of a nipple at the operative position.

Also shown by phantom lines in FIG. 6, is the tool 50 and its motor 230 which is pivotally mounted to the support structure of the present invention. As can be seen, tool 50 can be rotated about its pivot point (point P in FIGS. 3 and 6). By rotating about its pivot point P, the tool can be moved into the operative position around the shank 30 of the nipple 26. This rotational movement of the tool 50 is a function of the presence of a nipple in the operative position and a misalignment in one of the two axial directions. If no misalignment is sensed, the wheel's rotation does not stop and the next nipple is sequentially moved into the operative position. The tool 50 is not rotated into the operative position unless the wheel has stopped and a corrective action is required.

In order to facilitate assembly of a spoked wheel in the present invention, the mixer 190 is attached to a bracket 200 which is, in turn, connected to a roller 202. When no wheel is disposed in the present invention, the bracket 200 moves to a first position in the direction indicated by arrow Q1. When a wheel is moved into the present invention, the outside surface of its rim 22 pushes down on the roller 202 and the bracket 200 and roller 202 moves in a direction indicated by arrow Q2. The primary function of this assembly is to permit the bracket 200 to move in a direction Q1 when no force is exerted downward on roller 202 so that the actuator 192 is moved out of the way to provide a clearance for easier removal or insertion of a spoked wheel into the present invention.

Figure 7:
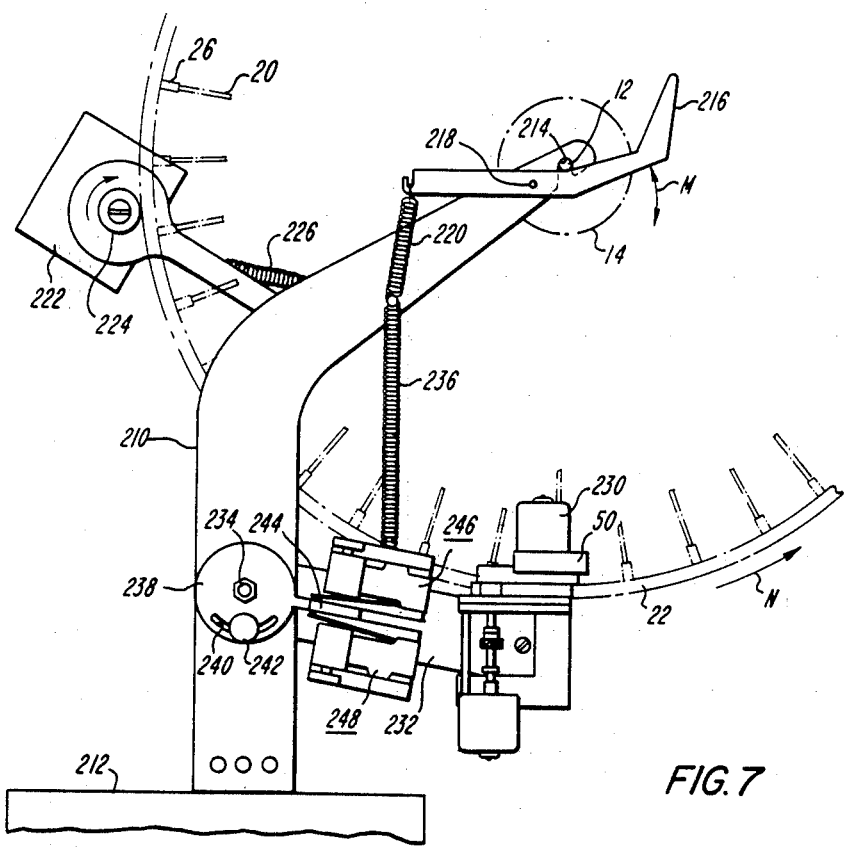
FIG. 7 is a side view of the present invention.

A side view of the present invention is illustrated in FIG. 7. A main support member 210 provides a rigid structure that can be attached to a base 212, such as a table. The support structure 210 provides a rigid frame from which the other components of the present invention are supported. The upper portion of the support structure 210 is provided with a slotted opening 214 that is shaped to receive the axle 12 of a spoked wheel. A rotatable arm 216 is pivotally attached to the support structure 210 by a pin 218. The pivot pin 218 can be a bolt or other suitable member capable of permitting the arm 216 to rotate about point 218 in the directions illustrated by arrow M. The relationship between the arm 216 and the upper portion of the support structure 210 permits the axle 12 of the spoked wheel to be pushed downward against the arm 216 in such a way so as to permit the axle 12 to be positioned easily within the slot 214 which is V-shaped in order to assure the proper alignment of the axle 12 with respect to the operative components of the present invention. A spring 220 is connected between the support structure 210 and one end of the arm 216 in such a way so as to provide an upward force against the axle 12 when it is positioned in the slot 214. This force is sufficient to retain the axle 12 in this position during the truing operation. With the axle firmly retained in the slot 214, the flange 14 and the rim 22 are free to rotate about the centerline of the axle 12.

In order to cause the wheel to rotate about the centerline of the axle 12, a main drive motor 222, or wheel motor, is used. Although various types of motors can be used, a one-thirtyfifth HP 2350 RPM motor has been used in a prototype of the present invention. The axle of the drive motor 222 is provided with a drive wheel 224 which is made of a material, such as rubber, that is able to provide a frictional force against the outside circumference of the rim 22. As the drive wheel 224 rotates about its central axis, the frictional force against the rim 22 causes the spoked wheel to rotate in the direction illustrated by arrow N. The drive motor 222 is provided with an automatic brake that, in conjunction with the drive wheel 224, is capable of holding the spoked wheel in position when the drive motor 222 is not energized. The drive motor 222 is pivotally attached to the support structure 210 and the drive wheel 224 is held against the outside circumference of the rim 22 by a spring 226.

The axial alignment member (reference numeral 160 in FIG. 6), the tool (reference numeral 50 in FIGS. 3 and 4) and the tool's drive motor 230 are supported by a platform 232 which is pivotally attached to the support structure 210. The platform 232 is free to rotate about pivot point 234 and is supported in an upward direction by spring 236. This configuration gives the platform 232 the ability to move slightly about its pivot point 234 in order to adjust to deviations of the spoked wheel in the radial direction. The spring 236 provides an upward force that, when a spoked wheel is disposed in the machine of the present invention, forces the axial alignment member 160 upward against the outside surface of the rim 22 and maintains the rim 22 in a proper configuration with respect to the pads, 162 and 164.

The present invention, as illustrated in FIG. 7, comprises a radial reference member 238 which is attached to the support structure 210. The radial alignment member 238 is provided with an arcuate slot 240 that permits a tightening bolt 242 to pass through it and rigidly retain the position of its reference bar 244. It should be understood that when the tightening bolt 242 is loosened, the radial alignment member 238 is free to rotate about its pivot point 234. This rotation causes its reference bar 244 to move in an arcuate path. This permits the operator, during initial setup procedures, to properly align the reference bar 244 between the top limit switch 246 and the bottom limit switch 248. The top and bottom limit switches, 246 and 248 respectively, are used to indicate radial misalignments of the spoked wheels. These two limit switches react to the radial position of the portion of the rim 22 that is presently in the operative position of the present invention. It should be understood that, in FIG. 7, the operative position discussed above is directly behind the tool 50. It is the position at which each nipple is sequentially disposed during its truing operation. If the radial position of that portion of the rim is less than the ideal radius of the spoked wheel, the platform 232 will be forced upward against the rim 22 by the spring 236 and the top limit switch 246 will be moved upward. This will cause the actuator of the top limit switch 246 to send a signal representing a radial misalignment in the upward direction. Similarly, if the radius of the rim in the operative position is greater than the ideal radius of the spoked wheel, bottom limit switch 246 will be caused to move away from the reference bar 244 and an appropriate signal from the bottom limit switch 248 will indicate a radial misalignment in the downward direction.

As the spoked wheel rotates about its axle 12, and successive nipples are disposed sequentially at the operative position of the present invention, the top and bottom limit switches, 246 and 248 respectively, will indicate the relative radial positions of the rim 22. If a radial misalignment is indicated, the tool 50 will be moved into the operative position and the appropriate nipple will be tightened or loosened, depending on the direction of radial misalignment. For example, if a signal from the top limit switch 246 indicates that the radius of the rim is too short, the nipple will be loosened. Conversely, if a signal from the bottom limit switch 248 indicates that the radius of the rim 22 is greater than the ideal radius, the appropriate nipple will be tightened. By successively performing this operation on all of the nipples as they sequentially pass through the operative position, the radii at each of the nipples can be gradually adjusted to conform with the ideal constant radius of an aligned wheel.

In a typical application of the present invention, the radius of the wheel is first aligned before the rim's axial misalignments are corrected. After inserting a spoked wheel into the present invention, the operator would first position the reference bar 244 at a reference position between the top and bottom limit switches, 246 and 248. When the machine is started, the drive motor 222 caused the spoked wheel to rotate until a signal is received from limit switch 196 (illustrated in FIG. 6) is received. This signal indicates that a spoke and nipple are located in the operative position of the present invention. When drive motor 222 stops, its automatic brake prevents the drive wheel 224 from rotating. Since the drive wheel 224 is disposed against the rim 22 of the spoked wheel, the wheel is held in position with the subject nipple disposed in the operative position. If either the top 246 or bottom 248 limit switches indicates a radial deviation of the rim 22, pivot motor 250 is energized and the tool 50 is caused to move toward the operative position. Although various types of motor 250 can be used, a 115 VAC eighteen RPM motor capable of thirty-five inch-ounces of torque has been used in a prototype of the present invention. If a signal from the top limit switch 246 is received, the tool 50 will unscrew the nipple by one turn. Conversely, if a signal from the bottom limit switch 248 is received, the tool 50 will screw in the nipple one turn. This procedure will be continued until the rim portion at each of the nipples is disposed at a proper radius that conforms with a constant reference radius for the spoked wheel.

It should be understood that the function of the pivot motor 250 is to move the tool 50 about its pivot point (reference letter P in FIG. 3) toward the operative position. Motor 230 provides the driving force to rotate the clamping members of the tool 50.

After the tool 50 causes the nipple to rotate one revolution about the centerline of its associated spoke, pivot motor 250 is energized in the reverse direction and the tool 50 pivots away from the operative position in order to provide clearance for the wheel to rotate. Each time the tool 50 is moved into position by the pivot motor 250, the nipple in the operative position is rotated one revolution. Therefore, it should be understood that many revolutions of the spoked wheel may be required in order to properly adjust the nipples to achieve a constant radius of the rim 22 with in predetermined limits of accuracy.

After the radius of the rim 22 is properly adjusted through the use of the top limit switch 246 and bottom limit switch 248, the axial misalignments of the rim 22 are corrected. Since a spoked wheel with a perfect radius will cause no signals to be sent by either the top or bottom limit switches, the present invention is free to perform the required axial alignments in conjunction with signals received from the limit switches, 172 and 174, of the axial alignment member 160 which is illustrated in FIG. 6. The total operation of the present invention consists of both radially and axially aligning the rim 22 of a spoked wheel.

Radial misalignments are first corrected by using the top limit switch 246 and the bottom limit switch 248 to determine the direction of radial misalignment, limit switch 196 to determine the position of a nipple in the operative position, pivot motor 250 to move the tool 50 into the operative position and motor 230 to cause the clamping member to rotate while engaging the shank of the nipple. When the radial alignment of the spoked wheel is complete, the axial misalignments of its rim 22 are corrected. As discussed above, this is accomplished by using signals from the limit switches, 172 and 174, in conjunction with limit switch 196 which determines that a nipple is in the operative position, mixer switch 190 which determines the type of spoke with which the nipple is associated and the pivot motor 250. The radial alignment procedure and the axial alignment procedure are similar in that they both utilize either clockwise or counterclockwise rotations of the nipple to correct an indicated deviation of the rim 22. One significant difference between these two alignment procedures is that the axial alignment procedure requires an additional limit switch, the mixer 190, to determine which one of two types of spokes is associated with the nipple at the operative position. The type of spoke sensed by the mixer 190 will determine whether or not a counterclockwise or a clockwise rotation of the nipple is required to correct the indicated deviation of the rim 22.

Figure 8:
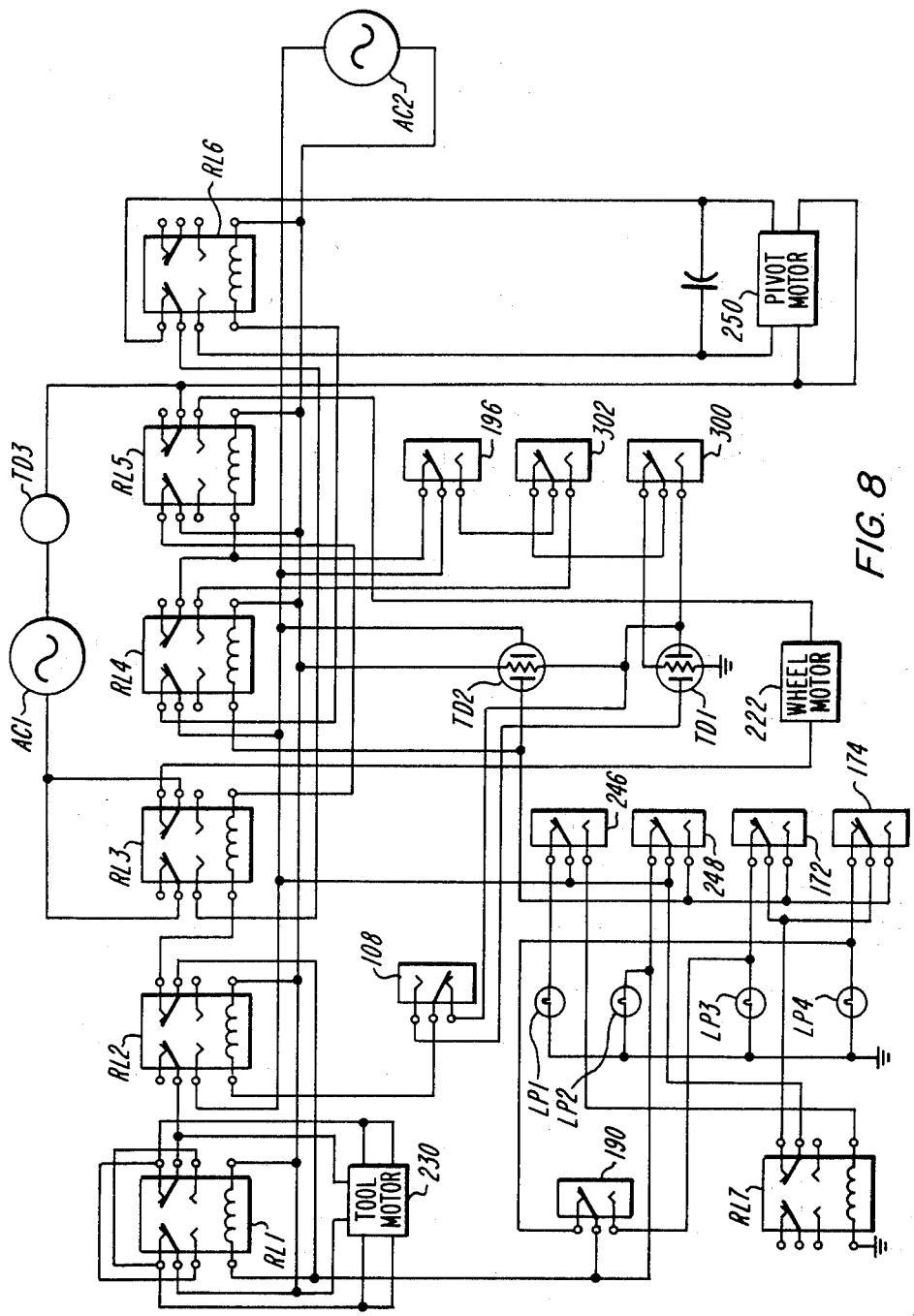
FIG. 8 is an electrical schematic of the control system utilized in the preferred embodiment of the present invention.

The above description of the present invention relates generally to the mechanical structure and configuration of the components utilized in the preferred embodiment of the present invention. FIG. 8 relates more directly to the control scheme that utilizes the signals from the various switches of the present invention and controls its motors. In order to make the description of the control schematic of FIG. 8 more clearly understandable, its symbols have been identified with the same reference numerals used above to describe the physical components of the present invention. For example, since the mixer switch in FIG. 6 is described by reference numeral 190, the mixer switch in the schematic of FIG. 8 will also be described by reference numeral 190. If a control component in FIG. 8 is not illustrated in the other figures, these components will be assigned unique reference numerals.

The present invention utilizes two alternating current power sources. A first source AC1 provides a 115 volt AC power source and a second source AC2 provides a 12 volt AC power source. The 115 volt AC source AC1 is used to provide power to the main drive motor 222, or wheel motor, and the pivot motor 250. The 12 volt AC source AC2 provides power for the tool motor 230.

In addition to the switches described above in conjunction with the description of the mechanical portions of the present invention, FIG. 8 illustrates additional switches that are not shown in FIGS. 1-7. For example, a "pivot in" switch 300 and a "pivot out" switch 302 are used to define the position of the tool 50 in relation to the operative position of the present invention. As the tool 50 is caused to rotate about its pivot point P (illustrated in FIG. 3) by pivot motor 250, some means must be provided to stop the pivot motor 250 when the tool, and its associated support structure, reaches the end of its limit of travel in either direction. The "pivot in" limit switch 300 sends a signal when the tool 50 reaches its limit of travel in the direction toward the operative position and the "pivot out" limit switch 302 provides a signal that indicates that the tool 50, and its associated structure, has reached its limit of travel in the retracted position away from the operative position.

A plurality of relay coils, RL1-RL7, are used to provide additional control logic for the present invention. Furthermore, time delays, TD1-TD3, are used to provide slight delays between the reception of a signal and the subsequent action that is logically required by the receipt of that signal.

During the operation of the present invention, the wheel motor 222, or main drive motor, causes the spoked wheel to rotate about its axle. As described above, this is accomplished by disposing a drive wheel 224 in contact with the outer circumference of the rim 22. The wheel motor 222 remains energized until a nipple contacts limit switch 196 in order to indicate that the spoked wheel has rotated to a position with a nipple in the operative position of the present invention. Until limit switch 196 senses the presence of a nipple at the operative position, the wheel motor 222 is provided with power from source AC1, through relay RL5. When a spoke is sensed in the operative position by switch 196, the wheel motor 222 is stopped and the pivot motor 250 is activated in a direction that will drive the tool 50 toward the operative position. The pivot motor 250 is controlled by relay RL6 that is, in turn, controlled by relay RL4. Therefore, as can be seen in FIG. 8, the pivot motor 250 is operated when the wheel motor 222 is stopped. Furthermore, the pivot motor 250 can be operated in either direction and is stopped by the "pivot in" limit switch 300 or the "pivot out" limit switch 302, depending on the direction of operation of the pivot motor 250. In other words, when the tool 50 is being moved into the operative position, the "pivot in" limit switch 300 is used to stop the pivot motor 250 and, alternatively, when the pivot motor 250 is used to rotate the tool 50 away from the operative position, the "pivot out" limit switch 302 is used to stop its operation.

As can be seen in FIG. 8, the bottom contact of the top limit switch 246 provides power to relay RL7 which, in turn, provides power to the left and right limit switches, 172 and 174 respectively. The mixer switch 190 is operatively associated with the left limit switch 172 and right limit switch 174. The action of the mixer switch 190 has the affect of reversing the normal logic in order to determine the proper direction of rotation of the tool motor 230 as a function of not only the axial misalignment of the rim, but also the specific nature of the spoke that is disposed in the operative position (i.e. is it connected to flange 14 or 16?). The tool motor 230 is a reversible motor controlled by relay RL1. Relay RL1 is, in turn, provided power by a combination of the mixer switch 190, the left limit switch 172 and the right limit switch 174. As discussed above in the description of the operation of the present invention, relay RL1 can also be provided with power from either the top limit switch 246 or the bottom limit switch 248. During the initial radial alignment of the spoked wheel, the top and bottom limit switches, 246 and 248, control the energization and direction of rotation of the tool motor 230. Limit switch 108 senses the completed revolution of the clamping members of the tool 50. As discussed above, in a preferred embodiment of the present invention, the limit switch 108 is disposed within the frame structure 52 of the tool 50 and illustrated in FIG. 4.

Although not a requirement of the preferred embodiment of the present invention, lamps LP1-LP4 are provided to give a visual indication of the operation of the top limit switch 246, bottom limit switch 248, left limit switch 172 and right limit switch 174, respectively. These lamps, LP1-LP4, are helpful during operation of the present invention and also provide aid in solving functional problems of the radial and axial alignment members.

The logical sequence of operation of the present invention is controlled by the limit switches, time delays and relays illustrated in FIG. 8. The schematic diagram of FIG. 8 represents an exemplary logic circuit used in a prototype of the present invention. However, it should be clearly understood that the specific circuitry and choice of components illustrated in FIG. 8 are not a requirement of the present invention. Instead, many alternative logic schemes and circuits can be used to control the components of the present invention and should be considered to be within its scope. For example, one skilled in the art will recognize that a programmed microprocessor could be utilized to provide all of the logic functions required by the present invention. Similarly, many alternative logic circuits can be used to sequence the operation of the various components of the present invention.

The logical relationship between the top limit switch 246, bottom limit switch 248, left limit switch 172 and right limit switch 174, along with the mixer switch 190, are illustrated in Table I.

TABLE I

| Top L.S. 246 | Bottom L.S. 246 | Left L.S. 172 | Right L.S. 174 | Mixer 190 | Tighten (cw) | Loosen (ccw) |
|---|---|---|---|---|---|---|
| 1 | 0 | — | — | — | — | x |
| 0 | 1 | — | — | — | x | — |
| 0 | 0 | 1 | 0 | 0 | — | x |
| 0 | 0 | 1 | 0 | 1 | x | — |
| 0 | 0 | 0 | 1 | 0 | x | — |
| 0 | 0 | 0 | 1 | 1 | — | x |

Throughout the discussion of Table I, the following conventions will be used. Clockwise and counterclockwise directions of rotation of the clamping members of the tool 50 will be as viewed from the bottom side of the tool 50, as illustrated in FIGS. 3 and 4. This conforms with the use of the clockwise and counterclockwise notation in FIG. 5. Therefore, a signal to the tool motor 230 to rotate the rotatable members of the tool 50 in a clockwise direction will have the affect of tightening the nipple. Similarly, if tool motor 230 is energized in the counterclockwise direction, the nipple will be loosened. Furthermore, a "1" in Table I indicates that a switch has been energized. Although various types of control circuitry could alternatively utilize normally open or normally closed switches in its logic scheme, the description of Table I will utilize a "1" to indicate that the limit switch sensed its particular activity. For example, if the top limit switch has a "1" in its column, it has detected an upward movement of the platform 232 and if the left limit switch 172 has a "1" in its column, this indicates that pad 162 has been pushed to the left. A "0" in the limit switch columns indicate the opposite status of the switches. The "tighten" and "loosen" columns in Table I indicate the action of the tool motor 230 that is indicated as a result of the switch statuses. Also, if a "—" is shown in the limit switch columns of Table I, this indicates that the status of the switch is irrelevant to the operation of the present invention.

As can be seen in Table I, if the top limit switch 246 is energized, the nipple should be loosened. Conversely, if the bottom limit switch 248 is activated, the nipple should be tightened. These results are true regardless of the status of left limit switch 172, right limit switch 174 or the mixer switch 190. It should also be understood that all of the limit switches described in Table I also depend on limit switch 196 before any motor commands are given.

If the top limit switch 246 and bottom limit switch 248 are deactivated, so as to indicate no radial deviation of the rim 22, the other limit switches of Table I are used to determine the direction of rotation of the tool motor 230. For example, if the left limit switch 172 is activated (i.e. the rim 22 pushed against pad 162) and the mixer switch 190 is deactivated, the nippled will be loosened. Referring to FIG. 1, the lack of a signal from the mixer switch 190 would indicate that the nipple in the operative position is connected to a spoke which is attached to flange 14, as opposed to flange 16. Therefore, a signal from limit switch 172 would indicate that the rim 22 deviates from an ideal reference plane in the direction indicated by the arrow x in FIG. 1. Therefore, a tightening operation on the nipple 26 would increase the tension on the spoke 20 and aggravate the already misaligned position of the rim 22. Therefore, to correct this type of axial misalignment, the nipple must be loosened to permit the rim 22 to move in the direction indicated by arrow Y in FIG. 1. It should be noted that the logic system illustrated in Table I is based on the assumption that the mixer switch 190 is disposed an even integral number of spokes away from the operative position so that the spoke most proximate to the actuator 192 of the mixer switch 190 is of an identical nature to the spoke connected to the nipple in the operative position of the present invention.

As can also be seen in Table I, a signal from the left limit switch 172 accompanied by a signal from the mixer switch 190 indicates that the nipple should be tightened and provides an appropriate signal to the tool motor 230 to rotate in a clockwise direction. It should be noted that this result is exactly opposite from the one discussed immediately above. This illustrates how the mixer switch 190 reverses the normal logic of the left and right limit switches, 172 and 174, respectively. This is because the mixer switch 190 indicates that the spoke connected to the nipple in the operative position extends from flange 16 to the rim 22 and a tightening of the nipple will cause the rim 22 to move away from pad 162 in the direction indicated by arrow Y. Of course, as illustrated in Table I, signals from the right limit switch 174 are treated in exactly the opposite manner as those received from the left limit switch 172.

The present invention provides an apparatus for automatically aligning a spoked wheel. Radial misalignment can be corrected through the cooperative use of its top and bottom limit switches along with the tool motor. Axial misalignment can be corrected through the cooperative use of its left and right limit switches in cooperation with the mixer switch and tool motor. The apparatus of the present invention can be easily controlled by any number of simple logic control systems, or, alternatively, a microprocessor. A tool is provided that is pivotable into the operative position around the nipple shank. The tool is capable of clamping onto the shank of the nipple and rotating it an integral number of revolutions. By sequentially indexing the spoked wheel to subsequent nipple positions, each spoke can be adjusted to properly align the wheel in both the radial and axial directions.

Although the present invention has been described in great detail and with significant specificity, it should not be considered to be so limited. Furthermore, although a preferred embodiment of the present invention has been specifically described in relation to the drawing, it should be understood that other embodiments of the present invention are within its scope.

What I claim is:

1. A spoked wheel truing machine, comprising:
   means associated with the axle of said wheel for supporting said wheel, said supporting means being arranged to support said wheel with the central axis of said axle being disposed is a generally horizontal plane;
   first means for rotating said wheel about said central axis of said axle;
   means for temporarily preventing said wheel from rotating about said central axis when the rim of said wheel is at one of a preselected plurality of arcuate positions;
   means for indicating locations of said rim at which said rim deviates from a predetermined plane perpendicular to said central axis of said axle;
   second means for rotating a nipple of said wheel about the centerline of a spoke that is associated with said nipple, said second rotating means being shaped to engage the outer surface of said nipple, said second rotating means comprising two jaw pieces, said two jaw pieces being associated for relative movement, each of said two jaw pieces having a clamping surface shaped to engage said outer surface of said nipple, said second rotating means being configured to cause the clamping surface of a preselected one of said two jaw pieces to move toward the clamping surface of the other one of said two jaw pieces in response to rotation of said second rotating means, said second rotating means being rotatable in two directions of rotation; and
   means for actuating said second rotating means upon a signal from said indicating means that represents a deviation of said rim from said predetermined perpendicular plane in excess of a predetermined magnitude.

2. The machine of claim 1, further comprising:
   means for causing said second rotating means to rotate said nipple approximately one revolution about said centerline of said spoke.

3. The machine of claim 1, further comprising:
   means for selecting one of said two directions of rotation of said second rotating means as a function of the particular configuration of said spoke.

4. The machine of claim 1, wherein:
   said second rotating means comprises a frame member mounted in pivotal association with said supporting means, a clamping member being connected to said frame member in rotational association, said clamping member being generally arcuate in shape with a first slot shaped to receive said outer surface of said nipple, said frame member having a second slot, said first and second slots being alignable to receive said nipple, said clamping member being configured to rotate about said nipple while said frame member is generally stationary with respect to said nipple, said clamping member comprising said two jaw pieces.

5. Apparatus for truing a spoked wheel having an axle and a plurality of spokes with each of said plurality of spokes being connected to a rim of said wheel with a nipple, said apparatus comprising:
   means for supporting said wheel, said supporting means being shaped to receive said axle of said wheel with the central axis of said axle being generally horizontal;
   first means for rotating said wheel about said central axis of said axle;
   means for stopping said first rotating means when a preselected one of said spokes is located in an operative position;
   means for determining whether said rim is disposed in a preselected vertical plane proximate said preselected one of said spokes;
   second means for rotating the nipple associated with said preselected one of said spokes in a preselected rotational direction, said second rotating means being shaped to receive the outer surface of said associated nipple between two jaw pieces, said two jaw pieces being associated for relative movement, said two jaw pieces being configured to move together in a clamping motion in response to rotation of said second rotating means; and
   means for selecting said preselected rotational direction as a function of the direction of deviation of said rim from said preselected vertical plane.

6. The apparatus of claim 5, further comprising:
   means for sensing radial deviations of said rim from a preselected radius extending from said central axis of said axle, said sensing means being operatively associated with said second rotating means and said stopping means.

7. The apparatus of claim 5, further comprising:
   means for limiting said second rotating means to one revolution of said nipple about a central axis of said preselected one of said spokes.

8. The apparatus of claim 5, further comprising:

means for selecting the preselected rotation direction as a function of the position of said preselected one of said plurality of spokes in relation to said axle and said rim.

9. The apparatus of claim 5, wherein:

said second rotating means comprises a frame member, a clamping member rotatably associated with said frame member, said clamping member comprising said two jaw pieces that are connected together with a resilient member that permits said jaw pieces to grip the outer surface of said nipple, said clamping member having a slot that permits said jaw pieces to receive said nipple therebetween.

10. The apparatus of claim 9, further comprising:

third means for rotating said clamping member with respect to said frame member.

11. A wheel truing machine for adjusting the tension of a spoke of a spoked wheel wherein said spoke is connected to a rim of said wheel by a nipple, said machine comprising:

means for supporting said wheel;

a frame member pivotally attached to said supporting means, said frame member being configured to pivot alternatively toward and away from said nipple;

a clamping member rotatably attached to said frame member, said clamping member being generally arcuate in shape and having a first slot shaped to permit said clamping member to be positioned with said nipple at the approximate center of rotation of said clamping member; and two jaw pieces slidably associated with said clamping member, said two jaw pieces being movably associated with each other, said two jaw pieces being shaped to provide a clamping force against the surface of said nipple.

12. The machine of claim 11, wherein:

said two jaw pieces are attached to each other by a resilient member and configured to provide said clamping force in response to rotation of said clamping member relative to said frame member.

13. The machine of claim 11, wherein:

said frame member has a second slot shaped to permit said frame member to be positioned with said nipple at said approximate center of rotation of said clamping member, said first and second slots being alignable for the purpose of permitting said nipple to move relative to said frame member toward said center of rotation of said clamping member.

14. The machine of claim 11, further comprising:

means for rotating said clamping member relative to said frame member.

15. The machine of claim 14, wherein:

said clamping member has a plurality of gear teeth shaped in its outer periphery.

16. The machine of claim 11, further comprising:

means for moving said frame member alternatively toward and away from said nipple.

17. The machine of claim 14, wherein:

said rotating means is configured to selectably rotate said clamping member in both clockwise and counterclockwise directions.

* * * * *